Patented Nov. 14, 1950

2,530,010

UNITED STATES PATENT OFFICE 2,530,010

VAT DYESTUFFS

Walter Fioroni, Binningen, Switzerland, assignor to Ciba Limited, Basel, Switzerland, a Swiss firm No Drawing. Application August 28, 1945, Serial No. 613,227. In Switzerland September 25, 1944

1 Claim. (Cl. 260—274)

It is known to treat Bz-1-benzenthronylaminoanthraquinones with alkaline condensing agents, and it is assumed that an N-heterocyclic 6-membered ring is thus formed:

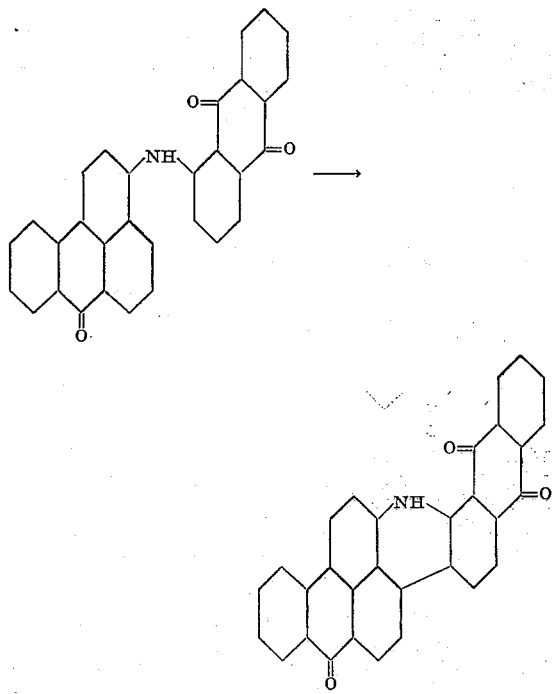

Further it is known to carry out the same reaction with 1-(Bz-1-benzanthronyl)-amino-4:5- or -8-aminoanthraquinones and treat the resulting products or, as the case may be, the starting materials with acylating agents (cf. U. S. Patents Nos. 1,850,562 and 1,877,947), and finally it is also known to treat the products thus obtained with halogenating agents (cf. U. S. Patent No. 2,022,240).

According to the present invention valuable dyestuffs are obtained by using in the above indicated processes such agents as acylating agents which yield the radical of a nuclear halogenated arylmono-carboxylic acid, that is to say by causing products obtained by alkaline condensation of amino-1-(Bz-1-benzanthronyl-amino) - anthraquinones to react with nuclear halogenated arylmono-carboxylic acids or functional derivatives thereof, or subjecting the correspondingly acylated starting materials to an alkaline condensation.

The products used as starting materials for the present process, obtained by alkaline condensation of amino-1-(Bz-1-benzanthronylamino) anthraquinones may contain the amino group, for example, in 4- or 8-position, preferably, however, in 5-position of the anthraquinone nucleus. Further, they may contain other substituents, such as halogen, linked, for example, to the benzanthrone radical, or also anthraquinonylamino groups. As examples of such starting materials there are named the products which are formed from the reaction product from 1 mol of Bx-1-halogenbenzanthrone and 1 mole of 1:4- or particularly 1:5-diaminoanthraquinone or from 1 mol of 6:Bz-1-dihalogenbenzanthrone with 1 mol or 2 mols of diaminoanthraquinones, e. g. 1:5-diaminoanthraquinone by the action of alkaline condensing agents.

According to the present process such condensation products obtained by alkaline condensation are treated with acylating agents which are derived from nuclear halogenated arylmonocarboxylic acids. As acylating agents there may especially be used the reactive functional derivatives of the nuclear halogenated benzoic acids. Advantageously there are used, for example, chlorides or anhydrides of the respective acids which may contain several halogen atoms or preferably only one halogen atom. Favorable results are especially obtained by using ortho-halobenzoic acids. The said acids are preferably used as acid halides. As examples there are mentioned 2-chloro- and 2-bromo-benzoylchloride, 4-chlorobenzoylchloride, as well as 2:4-dichlorobenzoylchloride.

The reaction of these acylating agents with the above named condensing agents can be carried out in known manner, for example, by heating in indifferent solvents, preferably of high boiling point, such as nitrobenzene, naphthalene and dichlorobenzene.

Especially valuable products are obtained in many cases by treating the resulting dyestuffs in known manner with halogenating agents, such as sulfuryl chloride or bromine.

The products obtained by the present process are valuable vat dyestuffs and can be used for dyeing and printing a great variety of animal and, especially, vegetable fibers, such as wool, silk and particularly cotton, linen, artificial silk and staple fiber from regenerated cellulose or superpolyamides. They can also be converted in known manner into leuco-ester-salts, and used in that form for dyeing and printing by the usual methods employed for this class of dyestuffs.

It is of particular importance that, inter alia, dyestuffs dyeing relatively pure olive to green shades can be obtained according to the present process.

It is surprising that most of the dyestuffs according to the present invention which contain only one halogen atom made e. g. by reaction with ortho-halogen benzoyl halides (without any after-treatment with halogenating agents) show properties concerning shade and fastness which are as good as or even superior to those of the known dyestuffs containing two halogen atoms and obtained by means of an after-treatment with halogenating agents. A still further improvement is obtained according to the present invention by introducing a further halogen atom into the dyestuff molecule.

The following examples illustrate the invention, the parts being by weight:

*Example 1*

20 parts of the alkaline condensation product from 1-(Bz-1-benzanthronylamino)-5-aminoanthraquinone of the formula

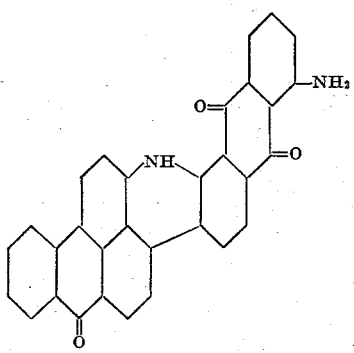

in 250 parts of nitrobenzene are boiled for 2 hours in a reflux apparatus with 20 parts of ortho-chlorobenzoylchloride. When cold the whole is filtered with suction, the residue is washed with nitrobenzene and the dyestuff of the formula

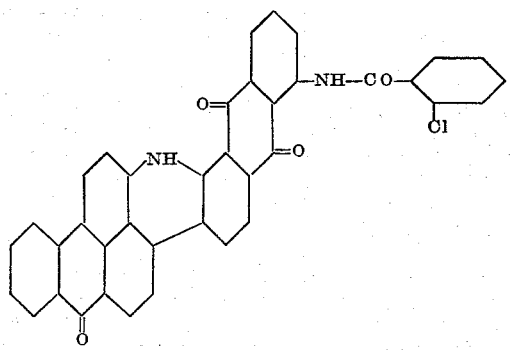

is subsequently isolated by distillation in steam and dried. It is an olive powder which dissolves in sulfuric acid with a green coloration. The dyeings on cotton or staple fiber obtained from the blue-violet vat are of clear olive shade.

*Example 2*

10 parts of the dyestuff obtained according to Example 1 and 4 parts of sulfuryl chloride are gradually heated to 100° C. in 200 parts of nitrobenzene, the whole is further heated for 4 hours at 100–110° C., suction-filtered when cold, the residue is washed with nitrobenzene and the latter is separated by steam distillation with addition of sodium carbonate. The dark olive powder dissolves in concentrated sulfuric acid with a green coloration. Cotton and staple fiber are dyed from the reddish-blue hydrosulfite vat olive shades having very good fastness properties. The analysis shows that the dyestuff contains 2 atoms of chlorine.

*Example 3*

15 parts of the alkaline condensation product from 1-(Bz-1-benzanthronylamino)-4-aminoanthraquinone in 160 parts of nitrobenzene are boiled for 2 hours in a reflux apparatus with 10 parts of ortho-chlorobenzoylchloride. When cold the whole is suction-filtered, the residue is washed with nitrobenzene and the dyestuff is subsequently isolated by distillation in steam and dried. It is a dark powder of the formula

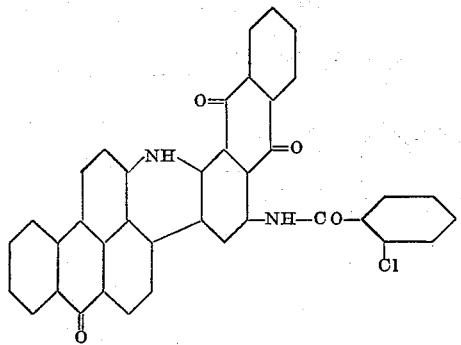

which dissolves in concentrated sulfuric acid with a brown coloration. When pouring this solution into water there are obtained olive flakes. Cotton is dyed from the blue hydrosulfite vat, after oxidizing in the air, yellow olive shades.

*Example 4*

7 parts of the alkaline molten diamino compound from the reaction product of 1 mol of 6-Bz-1-dibromobenzanthrone with 2 mols of 1:5-diaminoanthraquinone in 120 parts of nitrobenzene are heated in a reflux apparatus for 3 hours with 5 parts of ortho-chlorobenzoylchloride. When cold, the whole is suction-filtered, the residue is washed with nitrobenzene and the latter is separated by steam distillation with addition of sodium carbonate. The dyestuff is suction-filtered, washed until neutral and dried. It is a dark powder of the formula

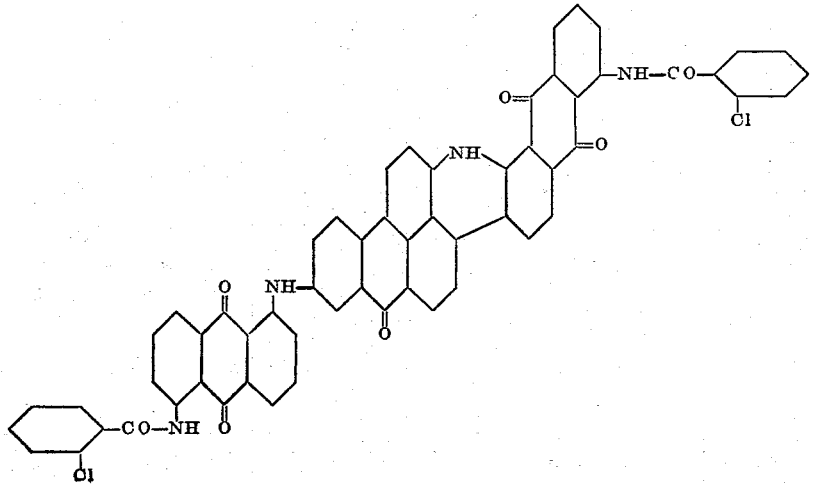

which dissolves in concentrated sulfuric acid with a green coloration. When pouring the solution into water there are obtained olive-brown flakes. Cotton is dyed from the brown black hydrosulfite vat blackish olive shades.

*Example 5*

20 parts of the alkaline condensation product from 1-(Bz-1-benzanthronylamino)-5-aminoanthraquinone are heated for about 1 hour to 210° C. in 250 parts of nitrobenzene and 25 parts of para-chlorobenzoylchloride and boiled for 2 hours in a reflux apparatus. After cooling to 50° C., the whole is suction-filtered, washed three times with nitrobenzene and the residue is freed from nitrobenzene by steam distillation with addition of 5 parts of sodium carbonate. After washing the dyestuff until neutral it is a dark olive powder which dissolves in concentrated sulfuric acid with a green coloration and yields olive flakes when poured into water. Cotton is dyed from a violet hydrosulfite vat yellow olive shades.

*Example 6*

20 parts of the alkaline condensation product from 1-(Bz-1-benzanthronylamino)-5-aminoanthraquinone in 250 parts of nitrobenzene are heated with 30 parts of 2:4-dichlorobenzoylchloride and kept boiling for 2 hours under reflux. When cold the dyestuff is suction-filtered, the residue is washed with nitrobenzene, the nitrobenzene is then removed by washing with chlorobenzene and alcohol and the dyestuff is washed until neutral and dried. The resulting product dissolves in concentrated sulfuric acid with a green coloration and yields olive flakes when poured into water. Cotton and staple fiber are dyed from the reddish blue vat yellowish olive shades.

*Example 7*

10 parts of the dyestuff obtained according to Example 5 in 200 parts of nitrobenzene and 4 parts of sulfuryl chloride are gradually heated to 100° C. in the course of about 2 hours, and maintained at 100–110° C. for 4 hours. When cold the whole is suction-filtered, the residue is washed with nitrobenzene and the dyestuff is freed from nitrobenzene by steam distillation, washed until neutral and dried. The dark dyestuff powder dissolves in concentrated sulfuric acid with a green coloration. Cotton and staple fiber are dyed from the gray-blue vat bluish olive shades.

*Example 8*

16 parts of bromine, 25 parts of anhydrous sodium acetate and 0.3 part of iodine and then 26.5 parts of the dyestuff obtained according to Example 1 are introduced into 200 parts of glacial acetic acid. After cooling the whole is stirred for some time, then gradually heated to boiling and boiled for 3 hours in a reflux apparatus. When cold the dyestuff is suction-filtered, washed until neutral and dried. The product has absorbed 1 mol of bromine and yields somewhat purer and yellower shades. The sulfuric acid solution is green and produces green olive flakes when poured into water.

*Example 9*

20 parts of 1-(Bz-1-benzanthronylamino)-5-aminoanthraquinone and 13 parts of ortho-chlorobenzoylchloride are poured into 250 parts of nitrobenzene, heated to boiling in the course of 1 hour and boiled for 2 hours under reflux. When cold, the whole is suction-filtered, the residue is washed with nitrobenzene and the intermediate product is freed from nitrobenzene by means of steam. The resulting 1-(Bz-1-benzanthronylamino) - 5 - (ortho - chlorobenzoylamino) - anthraquinone is a red-brown powder which dissolves in concentrated sulfuric acid with a yellow brown coloration and produces red-brown flakes when poured into water.

100 parts of anhydrous aniline, 11.5 parts of metallic sodium and the quantity of absolute alcohol necessary for the formation of the alcoholate are heated in the $N_2$-current until all sodium is converted into the alcoholate, 5 parts of 1-(Bz-1-benzanthronylamino)-5-ortho-chlorobenzoylamino-anthraquinone are introduced at 130° C., and the temperature is maintained at 130–135° C. for ¼ hour. When cold the mixture is acidified with dilute hydrochloric acid, the dyestuff is suction-filtered and washed until neutral. The resulting vat dyestuff which dyes clear olive shades is practically identical with the dyestuff obtained according to Example 1.

*Example 10*

1 part of the dyestuff obtained according to Example 1 is vatted at about 60° C. in 200 parts of water with addition of 4 parts by volume of caustic soda solution of 36° Bé and 2 parts of sodium hydrosulfite. This stock vat is added to a dye-bath of 2800 parts of water which contains 26 parts by volume of caustic soda solution of 36° Bé and 2.5 parts of sodium hydrosulfite. 100 parts of cotton are introduced into this bath at 50° C., the temperature is raised to 60° C. and dyeing is continued at this temperature for ¾ hour. The material is then squeezed, oxidized in the air, acidified in usual manner and finished. It is dyed fast olive shades.

What I claim is:

The vat dyestuff of the formula

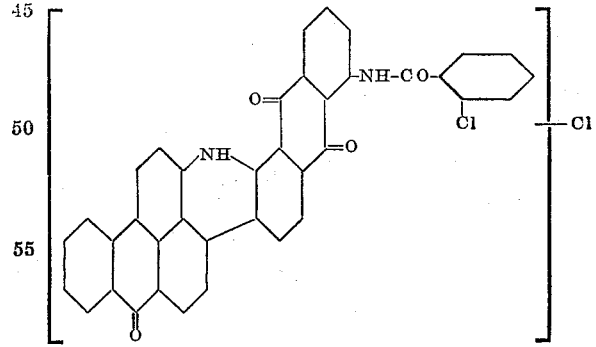

WALTER FIORONI.

REFERENCES CITED

The following references are of record in the file of this patent:

UNITED STATES PATENTS

| Number | Name | Date |
| --- | --- | --- |
| 1,850,562 | Neresheimer et al. | Mar. 22, 1932 |
| 1,903,181 | Honold et al. | Mar. 28, 1933 |
| 2,022,240 | Honold et al. | Nov. 26, 1935 |
| 2,040,380 | Honold et al. | May 12, 1936 |
| 2,204,232 | Schlichenmaier et al | July 11, 1940 |